(12) United States Patent
Bleil et al.

(10) Patent No.: US 8,256,524 B2
(45) Date of Patent: Sep. 4, 2012

(54) FIRE PROTECTION WITH FUEL CELL EXHAUST AIR

(75) Inventors: Julika Bleil, Hamburg (DE); Lars Frahm, Halstenbeck (DE); Andreas Westenberger, Buxtehude (DE); Claus Hoffjann, Hamburg (DE)

(73) Assignee: Airbus Operations GmbH (DE)

( * ) Notice: Subject to any disclaimer, the term of this patent is extended or adjusted under 35 U.S.C. 154(b) by 639 days.

(21) Appl. No.: 12/084,747

(22) PCT Filed: Nov. 9, 2006

(86) PCT No.: PCT/EP2006/010762
§ 371 (c)(1),
(2), (4) Date: Aug. 24, 2009

(87) PCT Pub. No.: WO2007/054314
PCT Pub. Date: May 18, 2007

(65) Prior Publication Data
US 2010/0018723 A1    Jan. 28, 2010

Related U.S. Application Data

(60) Provisional application No. 60/738,400, filed on Nov. 18, 2005.

(30) Foreign Application Priority Data

Nov. 10, 2005   (DE) .......................... 10 2005 053 692

(51) Int. Cl.
*A62C 3/08* (2006.01)
*A62C 3/00* (2006.01)
*A62C 2/00* (2006.01)
*A62C 35/00* (2006.01)

(52) U.S. Cl. ............................. 169/45; 169/11; 169/53

(58) Field of Classification Search .................. 169/5, 6, 169/11, 43, 45, 46, 53, 56, 60–62
See application file for complete search history.

(56) References Cited

U.S. PATENT DOCUMENTS

| | | | |
|---|---|---|---|
| 5,957,210 A | 9/1999 | Cohrt et al. | |
| 6,401,487 B1 * | 6/2002 | Kotliar | ............................. 62/640 |
| 6,560,991 B1 | 5/2003 | Kotliar | |
| 6,915,655 B2 | 7/2005 | Lee et al. | |
| 7,043,934 B2 | 5/2006 | Radermacher et al. | |
| 7,165,625 B2 | 1/2007 | Long | |
| 2002/0040940 A1 | 4/2002 | Wagner et al. | |
| 2002/0139542 A1 * | 10/2002 | Lessi et al. ....................... 169/46 | |
| 2003/0136879 A1 | 7/2003 | Grabow et al. | |
| 2005/0173929 A1 | 8/2005 | Wobben | |
| 2005/0257937 A1 | 11/2005 | Fabre | |
| 2008/0168798 A1 * | 7/2008 | Kotliar | ............................. 62/640 |
| 2009/0321090 A1 | 12/2009 | Bleil et al. | |

FOREIGN PATENT DOCUMENTS
AU    2004308691    7/2005
(Continued)

*Primary Examiner* — Darren W Gorman
(74) *Attorney, Agent, or Firm* — Lerner, David, Littenberg, Krumholz & Mentlik, LLP

(57) ABSTRACT

A fire protection system for reducing the danger of fire, which has a fuel cell for producing a nitrogen-enriched cathode exhaust air. The fuel cell is supplied with air and a fuel. Within the fuel cell, the air is then reduced to a determined oxygen content. The exhaust air is supplied to the room to be protected.

19 Claims, 6 Drawing Sheets

FOREIGN PATENT DOCUMENTS

| | | | |
|---|---|---|---|
| CA | 2473723 | A1 | 8/2003 |
| CA | 2551232 | | 7/2005 |
| CZ | 297177 | | 2/1999 |
| DE | 10343342 | | 2/2005 |
| EP | 1140625 | A1 | 10/2001 |
| EP | 1550482 | | 7/2005 |
| EP | 2210645 | A1 | 7/2010 |
| JP | 2003144568 | A | 5/2003 |
| JP | 2003272683 | A | 9/2003 |
| JP | 2003290380 | A | 10/2003 |
| JP | 2004350758 | A | 12/2004 |
| JP | 2005515045 | T | 5/2005 |
| JP | 2005522239 | T | 7/2005 |
| JP | 2005285782 | A | 10/2005 |
| RU | 1839095 | A1 | 12/1993 |
| RU | 93014902 | A1 | 11/1996 |
| RU | 2262600 | A | 4/2005 |
| RU | 2253492 | C1 | 6/2005 |
| RU | 2372956 | C2 | 11/2009 |
| SU | 1651930 | A1 | 5/1991 |
| WO | 9703631 | | 2/1997 |
| WO | 03061769 | A1 | 7/2003 |
| WO | 03066169 | A1 | 8/2003 |
| WO | 2005007273 | | 1/2005 |

\* cited by examiner

FIRE PROTECTION WITH FUEL CELL EXHAUST AIR

REFERENCE TO RELATED APPLICATIONS

This application claims the benefit of the filing date of German Patent Application No. 10 2005 053 692.1 filed Nov. 10, 2005 and of U.S. Provisional Patent Application No. 60/738,400 filed Nov. 18, 2005, the disclosure of which applications is hereby incorporated herein by reference.

FIELD OF THE INVENTION

The present invention relates to fire protection. In particular, the present invention relates to a fire protection system for reducing the danger of fire in a room, the use of such a fire protection system in an aircraft, the use of such a fire protection system in a building, the use of such a fire protection system on a ship, an aircraft having such a fire protection system, and a method for fire protection in a mobile or stationary room.

TECHNOLOGICAL BACKGROUND OF THE INVENTION

For about 40 years, halogenated hydrocarbons (Halon) have been used for extinguishing fires on board aircraft. Halon is partly or completely halogenated hydrocarbons, which engage chemically in the chain reaction of the fire and thus lead to an interruption of the reaction.

Admittedly, the Halon 1211 (chlorine-bromine-difluoro-methane for hand-held fire extinguishes) and 1301 (bromine-trifluoro-methane for installed extinguishing assemblies) contribute to the formation of the stratospheric ozone and therefore are included with the materials which were forbidden in the Montreal Protocol of the United Nations.

SUMMARY OF THE INVENTION

It may be desirable to provide improved fire protection in a room.

According to an exemplary embodiment of the present invention, a fire protection system for reducing the risk of fire in a room is provided, the fire protection system including a fuel cell for producing a nitrogen-enriched cathode exhaust air and a conduit assembly for conducting the nitrogen-enriched cathode exhaust air to the room, so that an oxygen content around in the room may be reduced, such that the danger of the fire may be reduced.

Thus, an effective system for reducing the risk of fire in rooms or objects may be provided, which uses oxygen-poor and nitrogen-rich exhaust air of a fuel cell system. In this manner, the exhaust air of a board-internal fuel cell system for fighting a fire or for avoiding fire danger may be used. In this manner, the exhaust air of a board-internal fuel cell system may be used for reducing the risk of fire. In addition, extinguisher devices may be dimensioned smaller or even completely eliminated. For this purpose, all types of fuel cells may be used, such as, for example, Alkaline Fuel Cells (AFC), Proton Exchange Membrane Fuel Cells (PEMFC), Phosphoric Acid Fuel Cells (PAFC), Molten Carbonate Fuel Cells (MCFC), Solid Oxide Fuel Cells (SOFC), or Direct Alcohol/Methanol Fuel Cells (DAFC/DMFC).

In this regard, the operating temperature of the electrolyte may not be important, rather solely the composition of the cathode exhaust air. This should contain an inert gas, such as nitrogen or the like. The exhaust air therefore may either be dry or contain water, depending on the fuel cell type and if necessary, the system settings.

Based on the inert properties of the nitrogen, this may particularly be well suited for fire protection of rooms.

According to a further embodiment of the present invention, the described fire protection system is provided for general oxygen reduction and therefore, for oxidation reduction in a room. With the storage of foods, the oxidation with air may lead to spoilage and the contained fat may become rancid. The use of anti-oxidation means in food and plastics may be reduced and therewith, the existence of radicals may be prevented.

According to a further embodiment of the present invention, the described fire protection system may be suitable for production of a germ-free/sterile atmosphere in a room, since the operating temperature of fuel cells generally lies at around 80° C. This may be particularly advantageous for the storage of organic foods and for clean rooms.

According to a further embodiment of the present invention, the described fire protection system may be suitable for producing an oxygen-reduced atmosphere in a room (in an aircraft) for medical/sport purposes (for example, altitude training). Breathing with reduced oxygen may lead to enrichment of hemoglobin red blood cells) in the blood. With increased hemoglobin, more oxygen may be trans-ported into the blood.

The described invention of the fuel cell system for reducing the oxygen may be suited, for example, for training rooms, sleeping chambers, work spaces, and in smaller embodiments, as a system for oxygen reduction with respiratory masks. Athletes, therefore, can increase their performance and mountain climbers can prepare for a longer stay at higher altitudes.

The quantity and quality of the required oxygen-reduced exhaust are generally dependent on the reality of the room to be protected. The following factors, such as for example, the density of the room (air renewal rate), the material properties of the stored goods or the presence of people, are decisive for monitoring the room and the control and regulation of the fire protection system for oxygen reduction with fuel cells.

According to a further embodiment of the invention, the fire protection system further has a regulating or control unit for adjusting the oxygen content within the room.

Adjustment of the oxygen content may be performed by changing the lambda value of the cathode of the fuel cell. The lambda value represents the ratio between the oxygen amount supplied to the fuel cell and the oxygen amount converted inside the fuel cell. The ratio may be adjusted by regulating the air supply (blower) of the fuel cell. In case the oxygen content in the cathode exhaust gas is too high, the air supply and therefore the lambda value has to be decreased. Thus, the oxygen content inside the room may be controlled by supplying adequate cathode exhaust air to the room.

Thus, the oxygen content may be adjusted or readjusted accordingly depending on the specifications. The control/regulation may take place completely automatically. For example, the oxygen content may be adjusted, when the room is to be entered by people, so that it lies approximately at 15% vol. In this manner, it may be ensured that the room can be entered by people, and on the other hand, however, the ignition danger or fire danger relative to normal air may substantially be reduced. The fire protection system, then, also may be used defensively or preventatively.

On the other hand, for example, by means of the regulating or control unit, it may be ensured also that the oxygen portion always remains under a determined, preset maximum value, for example, below 12% vol. or below a still smaller value.

Naturally, the regulating or control unit also may be designed as a pure control unit. The regulation then may be performed manually.

According to a further embodiment of the present invention, the regulating or control unit is designed for controlling or regulating at least one of an air supply of the cathode of the fuel cell, a fuel supply of the anode of the hill cell and the supply of the nitrogen-enriched cathode exhaust air into the room.

Thus, the power of the fuel cell may be adjusted depending on the requirements, in that more or less fuel, more or less air is supplied or more or less electrical power is required by the consumers. In addition, conducting of the nitrogen-enriched cathode exhaust air into the room may be controlled or regulated, in that, for example a corresponding valve is operated by the regulating or control unit.

According to a further embodiment of the present invention, the fire protection system further includes a mixer unit that mixes the cathode exhaust with ambient air before it is supplied to the room. Thus, the oxygen content in the cathode exhaust may be increased to a certain level after the cathode outlet. In addition it may cool the exhaust down so that a heat exchanger unit may not be required or can be decreased. The mixer unit may be controlled by the central controlling system.

According to a further embodiment of the present invention, the fire protection system further includes a measurement unit for measuring at least one-physical parameter, selected from the group consisting of the oxygen content within the room, the hydrogen content within the room, a temperature within the room, a pressure within the room, a moisture content within the room, and a detector for recognizing a fire characteristic within the room. In addition, the fire protection system includes a data line for transmitting the measured physical parameters from the measurement unit to the regulating or control unit.

Thus, the condition in the room may be monitored. If the temperature in the room increases, for example, or if smoke develops there, the oxygen content may be reduced further through the supply of the cathode exhaust air, in order to extinguish a developing fire. Likewise, the pressure may be monitored. If the pressure exceeds a determined value, for example, fortified, nitrogen-enriched cathode exhaust may be supplied, in which fire parameters are related to the intensity of the smoke development. The automatic and permanent maintenance of the predetermined parameter may be a primary object of the regulating and control unit of the fire protection system.

According to a further embodiment of the present invention, the fire protection system further includes a measurement unit for measuring at least one physical parameter, selected from the group consisting of the oxygen content of the exhaust air in a conduit system, the hydrogen content of the exhaust air in a conduit system, the carbon dioxide content of the exhaust air in a conduit system, the carbon monoxide content of the exhaust air in a conduit system, the nitrogen oxide content of the exhaust air, the volume flow of the exhaust air in a conduit system, a temperature of the exhaust air in a conduit system, a pressure of the exhaust air in a conduit system, a moisture content of the exhaust air in a conduit system. In addition, the fire protection system may include a data line for transmitting the measured physical parameters from the measurement unit to the regulating and control unit.

According to a further embodiment of the present invention, the fire protection system further includes a valve for releasing the exhaust of a conduit system to the surrounding air. If, for example, the oxygen content of the exhaust air of the conduit system exceeds or falls below a determined value, this may be detected by the measurement unit, transmitted to the regulating and control unit, and if necessary, the valve may be actuated, such that the exhaust air is not supplied to a room, rather to the surrounding air.

According to a further embodiment of the present invention, the fire protection system includes further a pressure relief valve for regulating pressurization in the room.

If, for example, the pressure in the room exceeds a determined threshold value or if the difference between the inner pressure in the room and the surrounding environment of the room exceeds a determined parameter, air may be released accordingly.

According to a further exemplary embodiment of the present invention, the fire protection system further includes a compressor for compressing the nitrogen-enriched cathode exhaust air, so that the fire extinguishing performance may be increased and/or a heat exchanger for cooling the nitrogen-enriched cathode exhaust air.

In this manner, the nitrogen-enriched cathode air may be compressed or cooled, before it is supplied to the room.

According to a further exemplary embodiment of the present invention, the fire protection system further includes a condenser for condensing of water from the nitrogen-enriched cathode exhaust air and a water tank for storing the condensed-out water.

In this manner, the cathode exhaust water may be produced, which may then be stored. From this storage, it then may be supplied to the water supply of the aircraft, for example, or it may be used in the event of a fire for extinguishing purposes.

A direct line also may be provided from the condenser to the water system of the aircraft (without having to store the condensed-out water in a water tank).

In addition, also a supply from the condenser to a hydrogen reformer system may be provided, since the hydrogen reformer is necessary for producing hydrogen from hydrocarbon water.

According to a further exemplary embodiment of the present inventions the fire protection system includes a climate control assembly for tempering the room. Thus, the air may be drawn, cooled, and again supplied to the room, without affecting the oxygen content in the room. In addition, the climate control assembly may be used for tempering the fuel cell exhaust before supply to the room. Therefore, for example, after the condensation, the temperature before supplying into the room may be regulated again to a determined level.

According to a further exemplary embodiment of the present invention, the fire protection system further includes a supply line for providing an air supply of the cathode of the fuel cell from the room, whereby the oxygen content in the room may be lowered further.

This supply, for example, may be switched on via the control and regulating device, when the oxygen portion in the room is to be lowered further, in order to further increase the fire protection. In other cases (or simultaneously), the fuel cell may be supplied with external air or also cabin air.

According to a further exemplary embodiment of the present invention, the regulating or control unit is designed for controlling or regulating the heat exchanger, a compressor, a mixer unit, the pressure relief valve, the bleed valves, the climate control assembly, and the supply of the water to the hydrogen reformer.

Depending on the specifications, therefore, the temperature of the nitrogen-enriched cathode exhaust gas conducted into the room may be cooled accordingly. In addition, the degree of compression of the anode supply air, the cathode supply air, or the nitrogen-enriched cathode exhaust supplied into the room may be adjusted.

According to a further exemplary embodiment of the present invention, the cathode exhaust may be interconnected to further fuel cells, so that the discharged air from one cathode serves as the supply for others. This leads to further lowering of the oxygen content in the discharged air of the interconnected fuel cells.

According to a further exemplary embodiment of the present invention of the fire protection system, the cathode exhaust air also may be interconnected to a device for additional reduction of the oxygen. For this purpose, for example, an air fractionation membrane may be suitable. It separates the cathode exhaust into two streams: oxygen rich air and nitrogen rich air. The oxygen rich air is emitted to the atmosphere; the remaining nitrogen-rich air may be supplied to the room.

According to a further exemplary embodiment of the present invention, the required electrical and thermal energy in the fire protection system is provided directly from the fuel cell.

Thus, no external energy supply may be required. The system may work in a self-sustaining manner and produces its energy itself.

According to a further exemplary embodiment of the present invention, the room for which the fire danger is reduced is a room in an aircraft.

According to a further exemplary embodiment of the present invention, the use of a fire protection system, as described above, is provided for fire protection of a room in an aircraft.

According to a further exemplary embodiment of the present invention, the use of such a fire protection system is provided for fire protection of a room in a building.

According to a further exemplary embodiment of the present invention, the use of such a (fire protection) system is provided for general oxygen reduction and therewith, for simulation of altitude and for oxidation reduction in a room.

In addition, an aircraft is provided, including a fire protection system, as described above, for fire protection of a room in an aircraft.

Furthermore, according to a further exemplary embodiment of the present invention, a method for fire protection is provided, in which a nitrogen-enriched cathode exhaust air is produced by a fuel cell and the nitrogen-enriched cathode exhaust air is conducted into a room, so that the oxygen content in the room is reduced, such that the fire danger is reduced.

In this regard, a method may be provided, through which an improved fire protection in a room of an aircraft may be made available. Further fire extinguishing systems, such Halon systems, may not be necessary. In addition certain areas in the aircraft such as the electronic bay or small hidden areas may be protected effectively of fire by reduction of the oxygen content within these areas.

According to a further exemplary embodiment of the present invention, physical parameters within the room are measured, such as the temperature within the room, the pressure within the room, the oxygen content within the room, the moisture content within the room, the hydrogen content within the room, or the development of smoke within the room. These measured parameters then may be transmitted from the measurement unit to the regulating or control unit for adjusting an oxygen content within the room. The oxygen content within the room may be adjusted by the supply of the cathode exhaust to the room. The oxygen content of the cathode exhaust may be adjusted by the control of the Lambda of the cathode by the controlling unit. In addition a mixer unit may increase the oxygen content or an air separation unit may further decrease the oxygen content of the cathode exhaust before supplying it to the room.

According to a further exemplary embodiment of the present invention, physical parameters in a conduit system are measured, such as for example the oxygen content of the exhaust air, the hydrogen content of the exhaust air, the carbon dioxide content of the exhaust air, the carbon monoxide content of the exhaust air, the nitrogen oxide content of the exhaust air, the volume flow of the exhaust air, the temperature of the exhaust air, the pressure of the exhaust air, and the moisture content of the exhaust air. In addition, the fire protection system may include a data line for transmitting the measured physical parameters from the measurement unit to the regulating and control unit.

In this manner, it may be ensured that the oxygen content in the room is adjusted respectively, as may be necessary according to the present conditions in the room.

Further exemplary embodiments of the invention are provided in the dependent claims.

Next, preferred exemplary embodiments of the present invention will be described with reference to the figures.

SHORT DESCRIPTION OF THE DRAWINGS

DETAILED DESCRIPTION OF EXEMPLARY EMBODIMENTS

Figure 1:
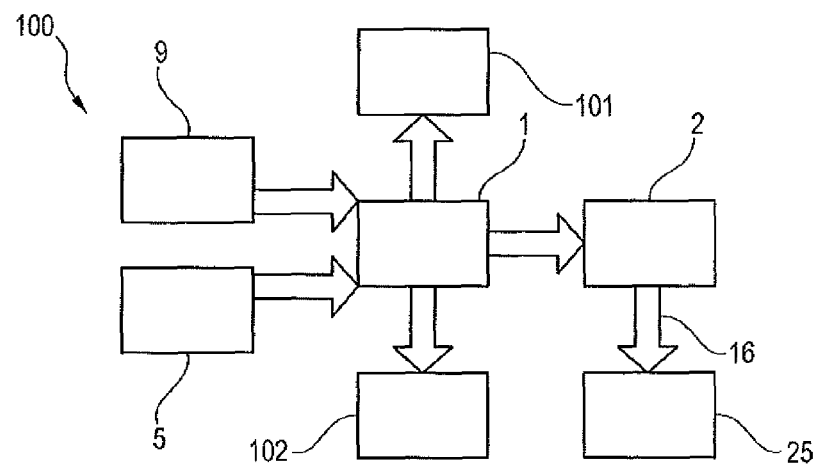
FIG. 1 shows a schematic flow diagram of a fire protection system according to an exemplary embodiment of the present invention.

The illustrations in the figures are schematic and not to scale.

In the following description of the figures, the same reference numerals may be used for the same or similar elements.

FIG. 1 shows a schematic flow diagram of a fire protection system for reducing the risk of a fire in a room, for example, in an aircraft, according to an exemplary embodiment of the present invention. As may be seen in FIG. 1, the fire protection system 100 has a fuel cell or fuel cell assembly 1, which is provided on the inlet side with corresponding raw materials 5, 9 and releases electrical-energy 101, thermal energy 102 and air with a reduced oxygen portion 2.

Water vapor may be added to the air and the fuel cell, depending on the design of the fuel cell 1. The oxygen-reduced air 1 is then supplied for fire protection purposes via a corresponding line 16 to the room to be protected.

Figure 2:
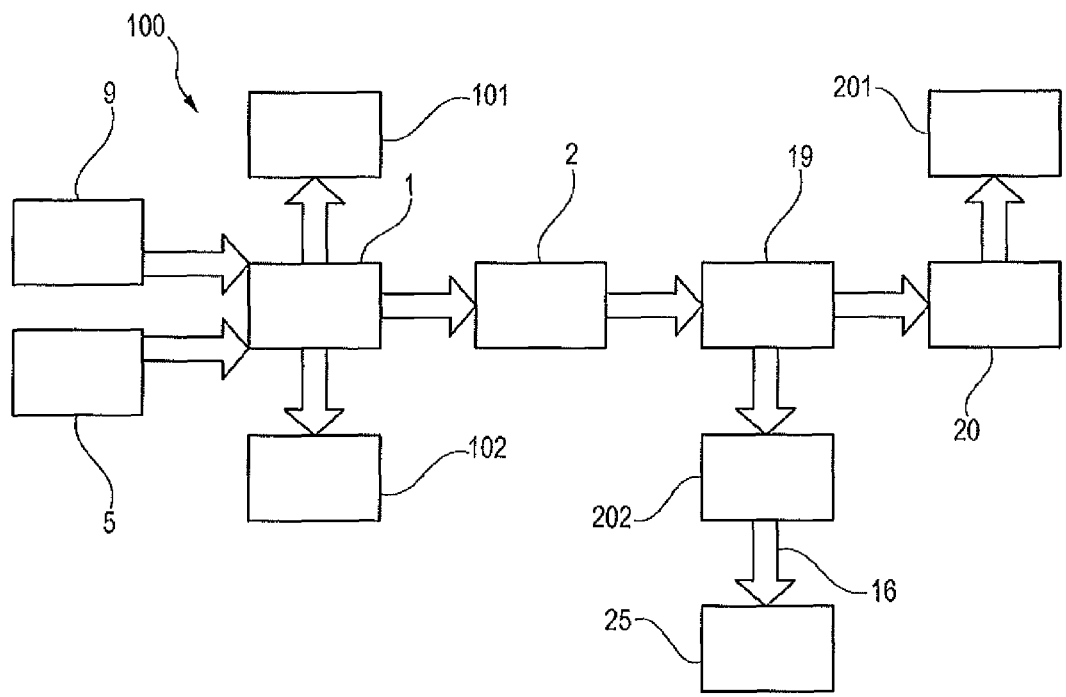
FIG. 2 shows a schematic flow diagram of a fire protection system according to a further exemplary embodiment of the present invention.

FIG. 2 shows a schematic flow diagram of a fire protection system 100 according to a further embodiment of the present invention. In the system shown in FIG. 2, the exhaust air 2 is separated by a condenser 19 into water 20 and dry, nitrogen-rich (oxygen-poor) air 202. Here, only the dry nitrogen-rich air 202 serves as an inert protective gas, which is supplied via the line 16 to the room to be protected.

All rooms and objects may be "made inert" by the exhaust air of the fuel cell or all fires in rooms and objects may be extinguished with the cathode exhaust air. With reducing the oxygen content to below approximately 15 vol %, the limitation may apply that these rooms and objects should not serve as permanent residences of people and animals. With approximately 17 vol %, the possibility of fire may be greatly reduced, longer inhabitance by people, however, may still be possible. The reduced oxygen portion may reduce the danger of fire or explosion.

The use of the fuel cell exhaust gas may be environmentally friendly and not toxic.

With the use of a fuel cell system for obtaining current, heat, and/or water, the oxygen-poor air may be eliminated as a by-product.

The fire protection system 100 may be used in mobile vehicles or aircraft as well as in stationary applications, for example, within buildings.

Figure 3:
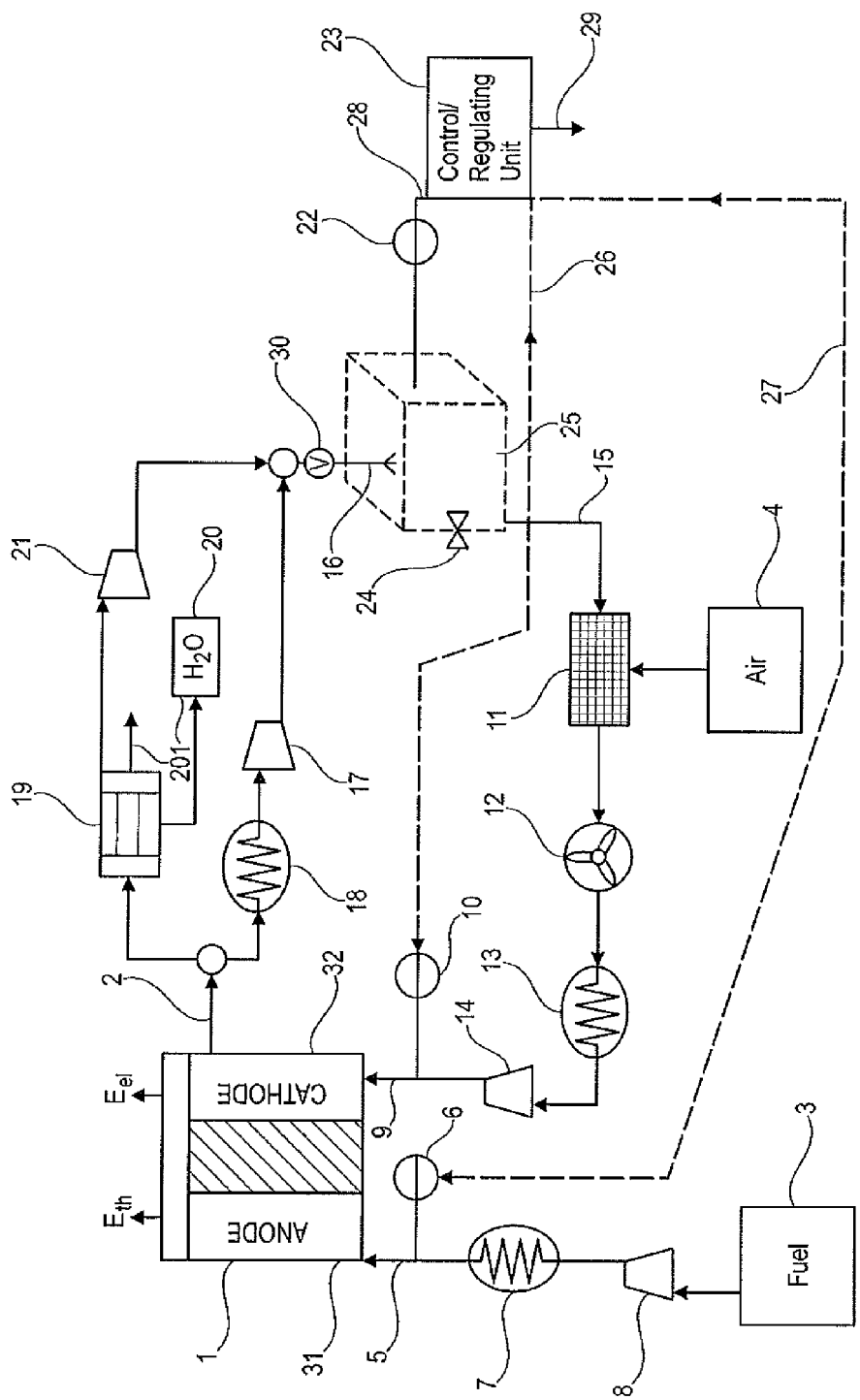
FIG. 3 shows a schematic principle diagram of a fire protection system according to an exemplary embodiment of the present invention.
Figure 4:
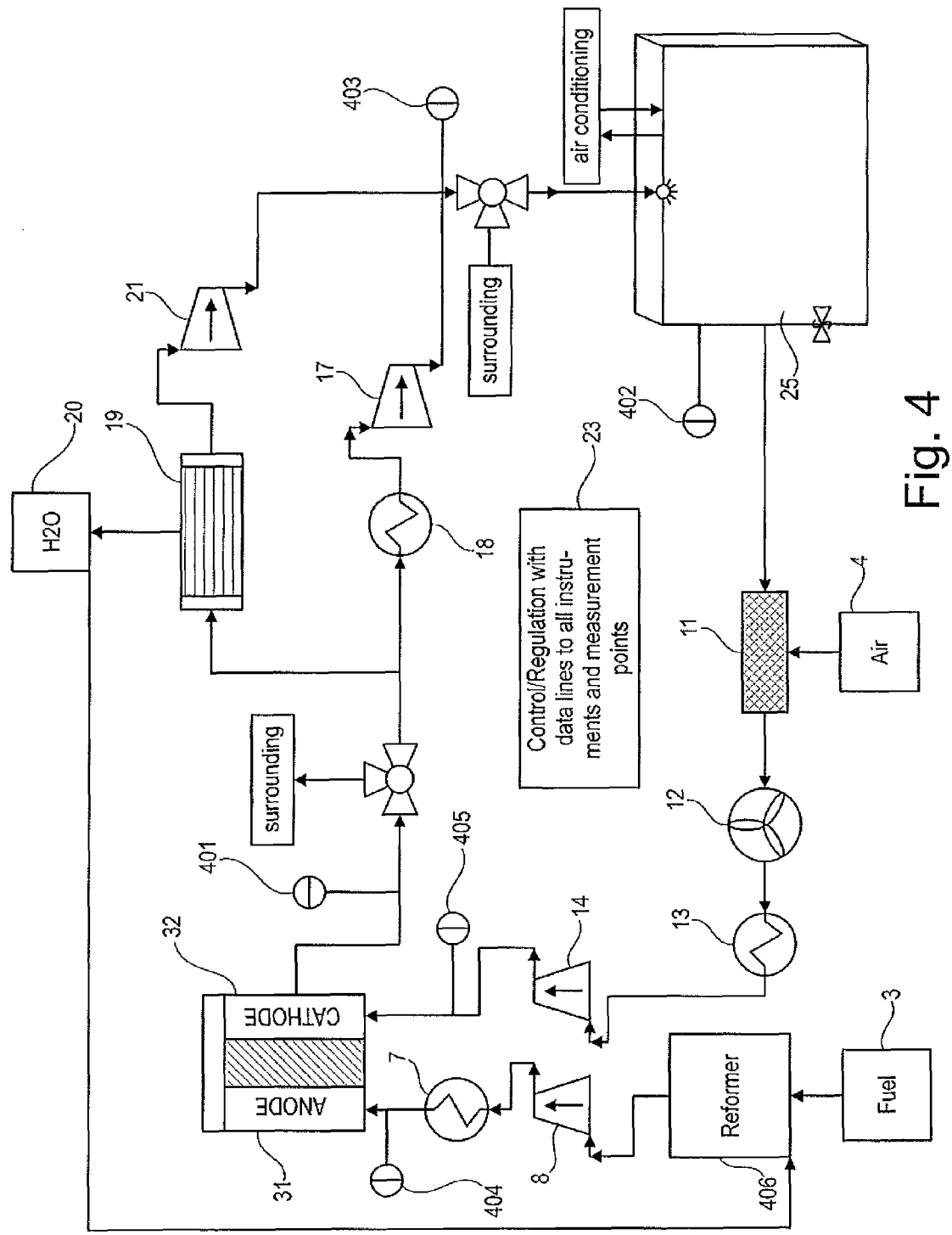
FIG. 4 shows a schematic principle diagram of a fire protection system according to a further exemplary embodiment of the present invention.
Figure 5:
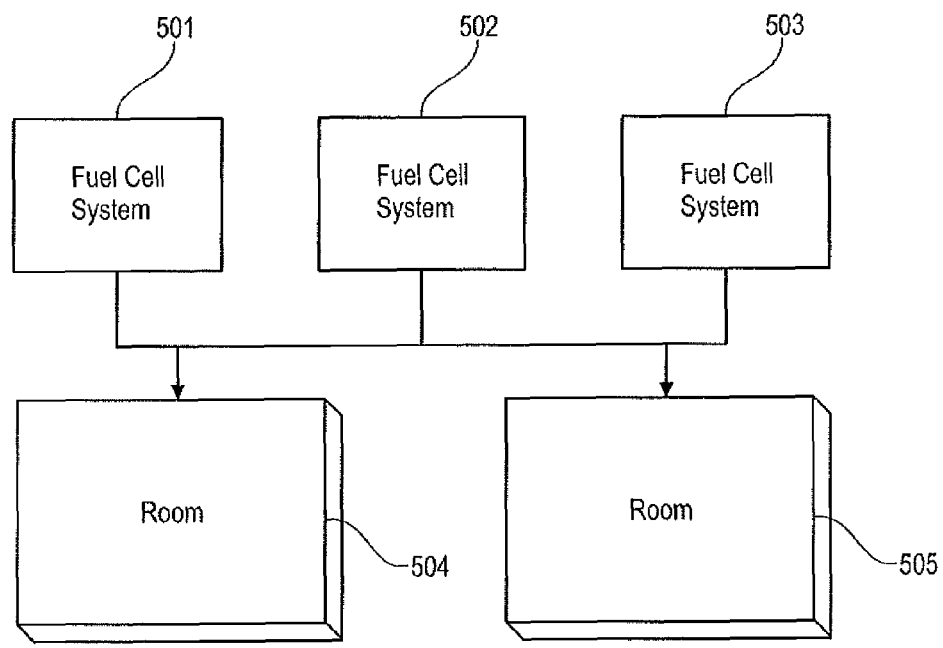
FIG. 5 shows a schematic principle diagram of a fire protection system according to an exemplary embodiment of the present invention.

FIG. 3 and FIG. 4 show, schematically, principle diagrams of a fire protection system 100 according to further exemplary embodiments of the present invention. With the fuel cell 1, all types of fuel cells may be used. In addition, multiple fuel cells 1 may be provided, which, for example, are connected together as a fuel cell battery, or (redundant) are mounted at separate locations (see fuel cell systems 501, 502, 503 and rooms 504, 505 in FIG. 4). In this manner, the safety of the inventive fire protection system 100 may be increased further.

With the fuel cells 1 to be used, for example, the so-called Alkaline Fuel Cell (AFC), Proton Exchange Membrane Fuel Cell (PEMFC), Phosphoric Acid Fuel Cell (PAFC), Molten Carbonate Fuel Cell (MCFC), Solid Oxide Fuel Cell (SOFC), or a Direct Alcohol/Methanol Fuel Cell (DAFC/DMFC) can be used. However, also other fuel cell types may be possible and desirable.

As may be seen in FIG. 3, the fuel cell 1 is supplied on the anode side with a fuel 3 and on the cathode side with air 4.

The fuel 3, which is supplied to the anode 31, may vary depending on the fuel cell type. It may not be important which type of fuel cell it is. For example, hydrogen may be used as the fuel 3, which is available reformed or stored, for example, from hydrocarbons (as is present in aircraft fuel). With the hydrogen reformation, water may be required, which may be provided through a supply line from the water storage to the reformer.

The fuel cell supply 5 is monitored and regulated by a measurement, control, and regulating unit 6. In this regard, it may operate as a sensor, which measures e.g. volume, temperature, and/or pressure, or also mass, and then further processes the correspondingly measured physical parameters, in order to perform then a corresponding control or regulation based thereon.

The measured data may be transmitted via the line 27 to a central control/regulating unit 23, which then conducts the corresponding adjustments at the fuel supply 5, for example, by adjusting corresponding vales accordingly.

In order to bring the fuel 3 to the temperature and pressure level of the fuel cell 1, if necessary, a heat exchanger 7 and/or a compressor 8 may be connected to the fuel cell 1.

The cathode-side air supply 9 of the fuel cell cathode 32 may be monitored and controlled/regulated similar to the fuel supply 5 by a measurement, control, and regulating unit 10. Further, measurement parameters may also be volume, temperature, pressure, mass or mass flow and also the lambda value (excess air) or the purity of the supplied air.

Also, the measured data may be transmitted via a line 26 to a central control/regulating unit 23, which may then conduct the corresponding valve adjustment or the like at the air supply 9.

In addition, a filter unit 11, a blower 12, a heat exchanger 13 or a compressor 14 may be connected individually or in any combination to the fuel cell 1 and to the control and regulating unit 23.

With the air supply 9, it is important that nitrogen is contained in the air. In aircraft, external or cabin air may be used, for example.

The possibility may also exist of conducting the air via a line 15 from the room 25 or the object 25 to which the nitrogen-enriched cathode exhaust air 2 is supplied again into the fuel cell 1. In this manner, the oxygen portion in the room 25 may be lowered further, whereby the fire protection can be still more effective.

Also the line 15 and the other air supply 4 may be control or regulated via the central control/regulation 23.

It is important that the exhaust gas of the cathode 2 has a reduced oxygen portion and a higher nitrogen portion than the cathode-side air supply 9. Depending on the fuel cell type, the cathode exhaust air contains the developed product water, as far as the hydrogen/oxygen reaction occurs at the cathode side.

This exhaust air 2 has inert properties from its increased nitrogen portion, which may lead to the result that a fire first cannot exist or at least spreads much less intensely than under normal conditions.

For example, the cathode exhaust air 2 with an oxygen conversion rate (lambda) of 2 (which means that 50% of the supplied oxygen reacts in the fuel cell 1 with the hydrogen to water) still has only an oxygen portion of approximately 10.5% vol. Normal air has an oxygen portion of approximately 21% vol.

This exhaust air may be supplied directly via a conduit system 16 to the room or the object 15 and therewith, contributes to the reduction of the oxygen portion in the room or the object 25.

Via the measurement units 401, 403 (see FIG. 4), the cathode exhaust air is monitored continuously by monitoring at least one physical parameter of oxygen portion, hydrogen portion, pressure, temperature, moisture content, volume flow, carbon dioxide, carbon monoxide and nitrogen oxide content. Further measuring points 402, 404, 405, may be located, for example, in the conduit system 16 before supplying into the room 25 or to the anode inlet or the cathode inlet of the fuel cells. The measured data are transmitted to the central controlled and regulating unit 23. Depending on the situation, the release valves may switch the supply into the room or the release to the environment.

Via a compressor 17 and/or a heat exchanger 18, the nitrogen-enriched cathode exhaust air 2 may be compressed and/or cooled, before it is supplied to the room/object 25.

As already mentioned, depending on the fuel cell type, the nitrogen-enriched cathode exhaust air 2 contains water, if necessary. In this case, a condenser 19 (in addition to or as an alternative to the compressor 17 and the heat exchanger 18) may be connected. The condenser 19 condenses the water out and stores it in a water tank 20 or leads directly to an external water system 201. The water system can be a board-internal consumer or also, however an extinguishing system 32 for extinguishing fires. Also this additional extinguishing system 32 can be controlled by the control regulator 23. With the provision of a hydrogen reformer 405, the condensed-out water can be supplied to the reformer process.

The remaining, slightly moist or completely dry air, depending on the degree of condensation, as described previously, may now be supplied directly to the fire source in the room or via a compressor 21.

The air in the room 25 may be reduced to a determined oxygen content. Depending on the use, the oxygen content may be varied.

With an oxygen content of 15% vol., many materials will not burn any longer. An entry of the room generally may always still be possible.

For example, the control/regulator 23 is programmed, such that the oxygen content in the room 25 is held at a constant 15% vol. However, also other programming is possible. For example, the control/regulator 23 can be programmed, such that the oxygen content in the room 25 always lies under an adjustable threshold value. If the threshold value is approached from below, if necessary further fuel cells can be connected or the power of the fuel cell and therefore the volume flow of the cathode exhaust may be increased.

The room 25 may have a measurement device 22 for this purpose, which is connected to the control/regulator 23 (via a line 28). The measurement device 22 serves for constantly measuring and monitoring the oxygen content and if necessary, further parameters, such as for example, pressure, temperature, the development of smoke, hydrogen content within the room 25.

In addition, a pressure relief valve 24 is provided, which may regulate pressurization.

The measurement device 22 measures continuously the oxygen content, the temperature and the pressure. The corresponding information is conveyed to the regulating or control unit 23.

The development of smoke may be detected also visually, for example (with the aid of a video camera). The captured images then are electronically evaluated and may, if necessary, be transmitted to the cockpit, so that the pilot may form an image of the situation in the room 25.

In addition, a climate control assembly may be provided, which draws air from the room 25, warms or cools it, and supplies it again to the room. In this manner, for example, with heating in the room, no air may have to be supplied externally to the room. In this manner, the oxygen content may remain constant and the temperature can be controlled. In addition, the climate control assembly also may be used for temperature regulation of the supply line 16.

The regulating or control unit 23 regulates and/or controls in particular the air supply 9 for adjusting the oxygen content in the exhaust, the fuel supply 5, the supply 2 of the nitrogen-enriched cathode exhaust air and all valves, heat exchangers, compressors, mixer units, climate control assemblies, and blowers installed in the fire protection system 100.

The noted control and regulating system may be controlled via a line 29. The supply line 16 from the room 25 may be regulated via a valve 30.

In addition, the electrical and thermal energy required in the system, such a for example for the compressors, the heat exchanger, or the climate control assembly, may be provided either from the fuel cell 1, from external sources (not shown in FIG. 3) or from a combination of both.

Figure 6:
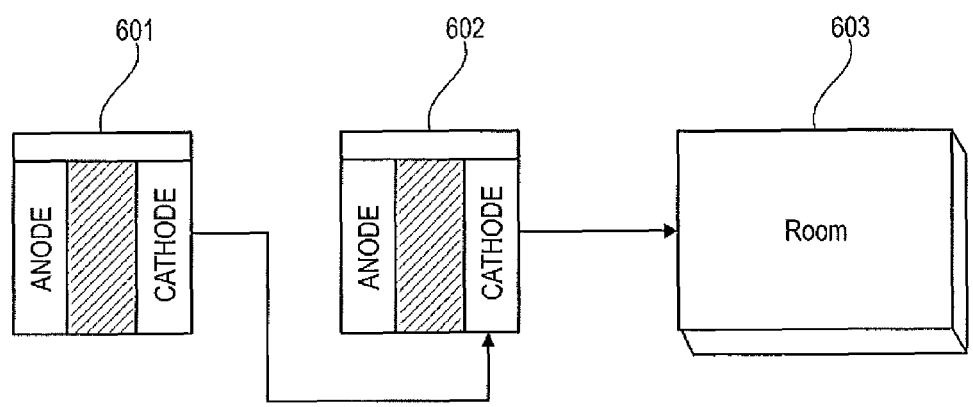
FIG. 6 shows a schematic principle diagram of a fire protection system according to an exemplary embodiment of the present invention.

FIG. 6 shows schematically a series connection of fuel cells 601, 602. The cathode exhaust air of a fuel cell 601 should serve here as air supply of another fuel cell 602. In this manner, the oxygen content of the cathode exhaust air of the second fuel cell 602 is lowered further. This technical arrangement is possible only up to a known degree, since fuel cells require a known oxygen portion in the cathode supply, in order not to "smother" from too little oxygen. The supply line of one fuel cell to another, as well as the supply line of the last fuel cell 602 into the room 603 may comprise an arrangement of measuring devices, compressors, and heat exchangers, as shown in FIG. 3.

Figure 7:
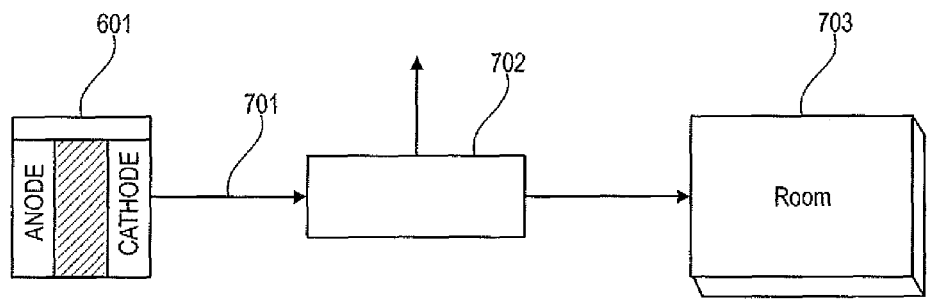
FIG. 7 shows a schematic principle diagram of a fire protection system according to an exemplary embodiment of the present invention.

FIG. 7 shows a further embodiment. Here, the cathode exhaust air 701 is connected to a further device for oxygen reduction 702, such as for example, an air fractionation membrane. In this manner, the oxygen content of the cathode exhaust air is lowered further before supply into the room 703. Air fractionation membranes divide air into an oxygen-enriched and a nitrogen-enriched air flow. The oxygen-enriched portion is released into the environment and the nitrogen-enriched portion is conducted into the room.

Figure 8:
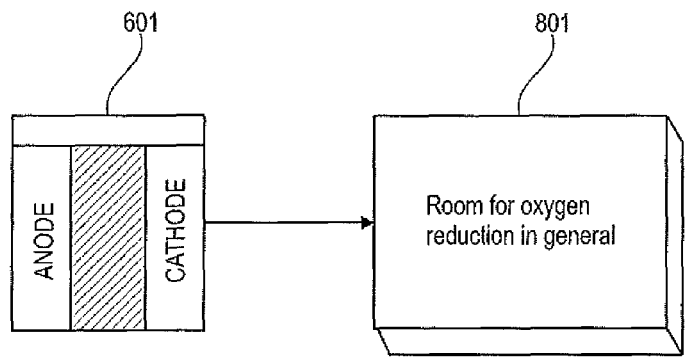
FIG. 8 shows a schematic principle diagram of a fire protection system according to an exemplary embodiment of the present invention.

The principles of oxygen reduction generally with fuel cells 601 is shown in FIG. 8. The advantages of oxygen reduction, which is provided for fire protection, the storage of goods, altitude training, and many other applications, can be supplemented by fuel cells in the following areas. Fuel cells operate silently, with low emissions, and very efficiently in the production of current and heat. In combination with all applications of the oxygen reduction, the fuel cell advances to an energy and security system. Current and heat may be used or supplied locally. The exhaust gas reduces the oxygen content in rooms 801. The rooms 801 are protected from fires and the oxidation behavior of stored goods is reduced. A further advantage is provided by the operating temperature of the fuel cell, which amounts to at least 70° C., so that the exhaust gas may be considered as almost germ-free/sterile.

The fuel cell may provide energy, fire protection, altitude simulation, and improved storage conditions in one system.

Figure 9:
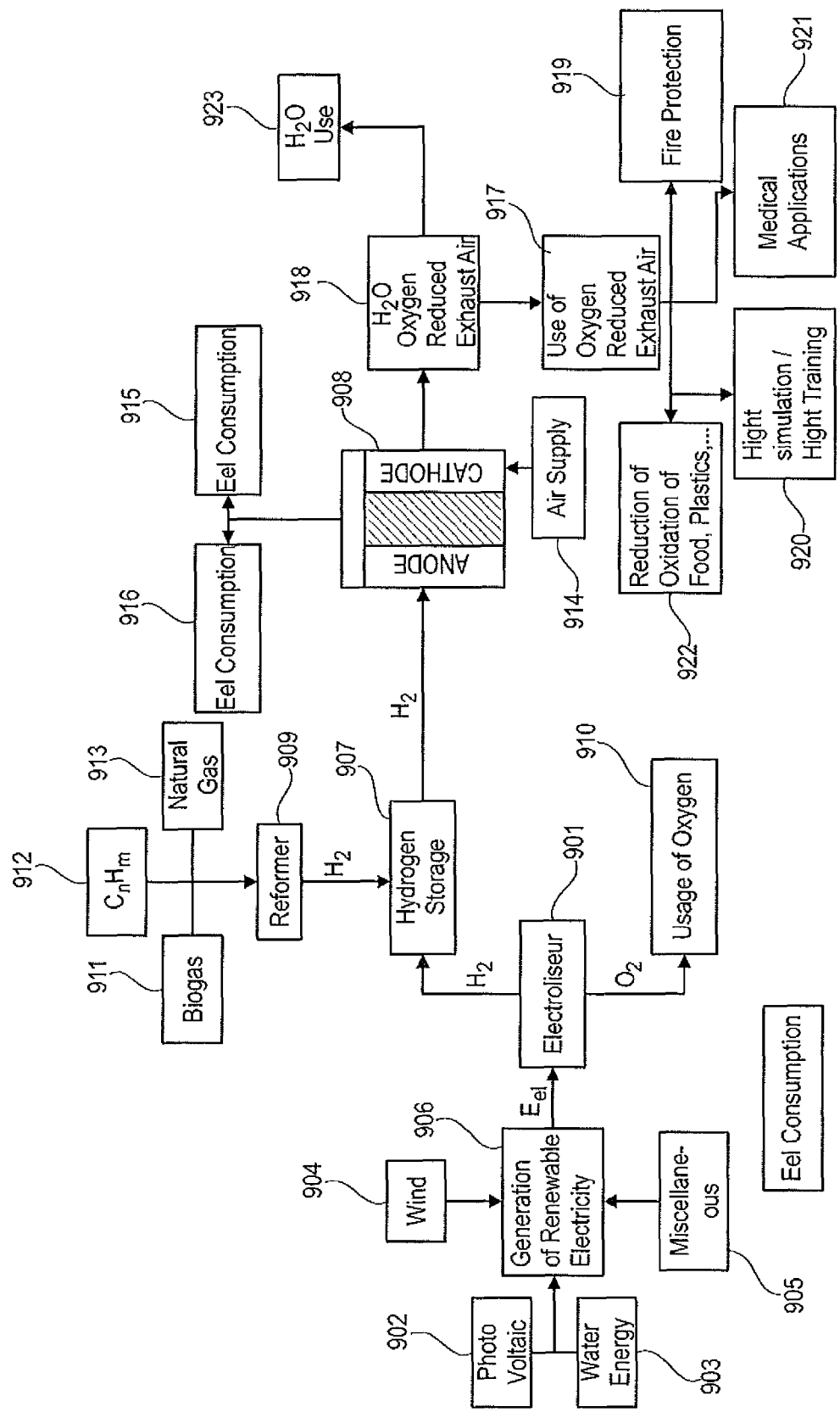
FIG. 9 shows a schematic principle diagram of a fire protection system according to an exemplary embodiment of the present invention.

A schematic principle diagram of a self-sufficient energy and security system with the additional applications in athletic, medical, and logistic areas is shown in FIG. 9. Current may be produced renewably in different ways and supplied in an electrolyzer 901 for the production of hydrogen and oxygen.

The production of the current takes place, for example, via photovoltaics 902, water power 903, wind power 904, or in another manner 905. A corresponding generator 906 (for example, a hydroelectric plant or a wind turbine) conducts the current from the electrolyzer 901.

The electrolyzer may generate hydrogen and oxygen from water. Oxygen may be used, for example in industrial applications or released to the environment. The produced hydrogen can be stored in a storage 907 or can be supplied directly to the fuel cell 908. Alternatively to the electrolyzer, the hydrogen may be produced by a reformer 909, which is provided via a bio-gas storage 911, hydrocarbon storage 912, or natural gas storage 913. The oxygen is stored in a storage 910.

In addition to hydrogen, the fuel cell requires air, which is supplied via the supply 914. The product energy in a thermal and electric form can be supplied to a thermal consumer 915 or an electrical consumer 916 or supplied in a network. Likewise, the produced water 923 can be used. The application possibilities of the oxygen-poor air 917 are numerous, such as for example, the use for fire protection 919, for altitude simulation 920, and for medical purposes 921 or for oxidation reduction for storing of food or plastics.

The oxygen-poor air is separated from produced water in the separating device 918.

The invention is not limited in its design to the preferred embodiments shown in the figures. In addition, a plurality of variations is contemplated, which make use of the shown solution and the inventive principle also with essentially other different embodiments.

In addition, it is noted that "including" does not exclude other elements or steps and "a" or "one" does not exclude a plurality. Furthermore, it is noted that features or steps, which are described with reference to one of the above embodiments, also can be used in combination with other features or steps of other embodiments described above. Reference numerals in the claims are not to be viewed as limitations.

The invention claimed is:

1. A fire protection system for reducing a fire danger in a room, comprising:
a fuel cell for producing a nitrogen-enriched cathode exhaust air;
a conduit system for supplying the nitrogen-enriched cathode exhaust air into the room, so that an oxygen content in the room is reduced, such that the fire danger in the room lowers;
a first measurement unit for measuring a physical parameter selected from the group consisting of the oxygen content of the exhaust air in the conduit system, and the hydrogen content of the exhaust air in the conduit system; and
a control unit for adjusting the oxygen content within the room by changing a lambda value of the cathode of the fuel cell;
wherein the control unit further controls an air supply to the cathode of the fuel cell.

2. The fire protection system of claim 1, wherein the control unit further adjusts the oxygen content within the room.

3. The fire protection system of claim 2, wherein the control unit further controls at least one of a fuel supply to the anode of the fuel cell and the supply of the nitrogen-enriched cathode exhaust air into the room.

4. The fire protection system of claim 1, further comprising:
a second measurement unit for measuring at least one physical parameter selected from the group consisting of oxygen content within the room, hydrogen content within the room, a temperature within the room, a pressure within the room, and development of smoke within the room; and
a data line for transmitting the measured physical parameters from the second measurement unit to the control unit.

5. The fire protection system of claim 1,
wherein the first measurement unit further measures a physical parameter selected from the group consisting of a carbon dioxide content of the exhaust air in the conduit system, a carbon monoxide content of the exhaust air in the conduit system, a nitrogen oxide content of the exhaust air in the conduit system, a volume flow of the exhaust air in the conduit system, a temperature of the exhaust air in the conduit system, a pressure of the exhaust air in the conduit system, and a moisture content of the exhaust air in the conduit system.

6. The fire protection system of claim 1, further comprising:
a data line for transmitting the measured physical parameters from the first measurement unit to the control unit.

7. The fire protection system of claim 1, further comprising:
a bleed valve for releasing the cathode exhaust air into the environment.

8. The fire protection system of claim 1, further comprising:
a pressure relief valve for regulating a pressurization in the room.

9. The fire protection system of claim 1, further comprising at least
one of a compressor for compressing the nitrogen-enriched cathode exhaust air, a heat exchanger for cooling the nitrogen-enriched cathode exhaust air, and a mixer unit for mixing the nitrogen-enriched air with ambient air.

10. The fire protection system of claim 1, further comprising:
a condenser for condensing water out of the nitrogen-enriched cathode exhaust air; and
a water tank for storing the condensed water.

11. The fire protection system of claim 1, further comprising:
a climate control assembly for temperature regulation of the room.

12. The fire protection system of claim 1, further comprising:
a supply line for providing an air supply of the cathode of the fuel cell from the room, whereby the oxygen content in the room can be lowered further.

13. The fire protection system of claim 1, wherein the control unit further controls a heat exchanger, a compressor, a pressure relief valve, a climate control assembly, a bleed valve, a mixer unit, a hydrogen reformer, and a supply of water to the hydrogen reformer.

14. The fire protection system of claim 1,
wherein electrical and thermal energy required in the fire protection system is provided directly from the fuel cell.

15. The fire protection system of claim 1, further comprising:
a second fuel cell or an air fraction membrane connected to the first fuel cell for further reduction of the oxygen content of the cathode exhaust air.

16. The fire protection system of claim 1, wherein the room is a room in an aircraft.

17. An aircraft comprising a fire protection system for fire protection of a room in the aircraft, the fire protection system comprising:
a fuel cell for producing a nitrogen-enriched cathode exhaust air;
a conduit system for supplying the nitrogen-enriched cathode exhaust air into the room, so that an oxygen content in the room is reduced, such that a fire danger in the room lowers;
a measurement unit for measuring a physical parameter selected from the group consisting of the oxygen content of the exhaust air in the conduit system, and the hydrogen content of the exhaust air in the conduit system; and
a control unit for adjusting the oxygen content within the room by changing a lambda value of the cathode of the fuel cell;
wherein the control unit further controls an air supply to the cathode of the fuel cell.

18. A method for fire protection in a room comprising:
supplying air from outside of the room to a fuel cell;

producing a nitrogen-enriched cathode exhaust air with the fuel cell;

supplying the nitrogen-enriched cathode exhaust air into the room, so that an oxygen content in the room is reduced, such that a fire danger in the room lowers;

measuring, by a first measurement unit, a physical parameter, selected from the group consisting of the oxygen content of the exhaust air in a conduit system, and the hydrogen content of the exhaust air in the conduit system; and adjusting the oxygen content within the room by a regulating or control unit by changing a lambda value of the cathode of the fuel cell;

wherein the regulating or control unit is embodied for controlling or regulating an air supply to the cathode of the fuel cell.

19. The method of claim 18, further comprising:

measuring, by a second measuring unit, at least one physical parameter selected from the group consisting of an oxygen content within the room, a hydrogen content within the room, a temperature within the room, a moisture content within the room, a pressure within the room, and a detection of a fire characteristic within the room; and transmitting the measured physical parameters from the second measurement unit to the regulating or control unit for adjusting an oxygen content within the room by controlling the lambda value of the fuel cell cathode.

* * * * *